United States Patent
Flockhart et al.

(10) Patent No.: US 6,999,579 B2
(45) Date of Patent: Feb. 14, 2006

(54) METHOD AND APPARATUS FOR THE EFFICIENT UTILIZATION OF TRUNK BANDWIDTH IN A GLOBAL ENTERPRISE

(75) Inventors: Andrew D. Flockhart, Thornton, CO (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 458 days.

(21) Appl. No.: 10/158,369

(22) Filed: May 29, 2002

(65) Prior Publication Data

US 2003/0223569 A1 Dec. 4, 2003

(51) Int. Cl.
*H04M 3/00* (2006.01)
*H04M 5/00* (2006.01)
*H04M 7/00* (2006.01)

(52) U.S. Cl. ............ 379/266.01; 379/220.01; 379/265.02

(58) Field of Classification Search .......... 379/265.02, 379/265.09, 266.01, 266.07, 219, 220.01, 379/221.01
See application file for complete search history.

(56) References Cited

U.S. PATENT DOCUMENTS

| | | | | |
|---|---|---|---|---|
| 5,335,268 A | * | 8/1994 | Kelly et al. ............ | 379/112.05 |
| 5,450,482 A | * | 9/1995 | Chen et al. ............... | 379/230 |
| 5,633,924 A | * | 5/1997 | Kaish et al. ........... | 379/266.03 |
| 5,684,870 A | * | 11/1997 | Maloney et al. ....... | 379/212.01 |
| 5,740,238 A | | 4/1998 | Flockhart et al. ........... | 379/221 |
| 5,754,639 A | | 5/1998 | Flockhart et al. ........... | 379/221 |
| 5,910,983 A | * | 6/1999 | Dezonno et al. ........ | 379/266.04 |
| 5,937,051 A | * | 8/1999 | Hurd et al. ............ | 379/212.01 |
| 6,049,547 A | | 4/2000 | Fisher et al. ................. | 370/412 |
| 6,192,122 B1 | | 2/2001 | Flockhart et al. ............ | 379/266 |
| 6,295,353 B1 | | 9/2001 | Flockhart et al. ............ | 379/265 |

* cited by examiner

*Primary Examiner*—Benny Tieu
(74) *Attorney, Agent, or Firm*—Sheridan Ross P.C.

(57) ABSTRACT

The present invention relates to the operation of interconnected switches or call centers. In particular, the present invention allows communication bandwidth to be conserved, by providing audible feedback from a switch that is relatively local to a caller, even though a call center that is remote to the caller has accepted responsibility for routing the call to an agent. In addition, the present invention simplifies the administration of audible feedback by allowing such feedback to be provided from a centralized or common location. The present invention allows for the reliable operation of call center arrangements, without requiring that communication channels interconnecting switches or call centers that are grossly oversized in proportion to the data required to be carried in association with conversations between callers and agents. In addition, the present invention allows for call center processing features to be fully functional on a receiving switch, while audible feedback is provided to a caller on hold from a sending switch.

27 Claims, 4 Drawing Sheets

FIG. 4

| CALLER | SENDING SWITCH (USA) | ISDN MESSAGING | RECEIVING SWITCH (INDIA) |
|---|---|---|---|
| ORIGINATES CALL 404 | | | |
| | VECTOR PROCESSING QUEUES CALL AT SENDING SWITCH 408 | | |
| CALLER HEARS AUDIBLE FEEDBACK PROVIDED BY SENDING SWITCH 412 | AUDIBLE FEEDBACK PROVIDED TO CALLER | | |
| | LOOKAHEAD INTERFLOW CALL ATTEMPT PLACED TO RECEIVING SWITCH 416 | SETUP -> | 420 |
| | | | VECTOR PROCESSING CHECKS ACCEPTANCE CONDITIONS 424 |
| | | | CALL ACCEPTED AND QUEUED |
| | | <- PROGress | 432 |
| | DEQUEUE CALL AT SENDING SWITCH 436 | | |
| | DO NOT TERMINATE VECTOR PROCESSING 440 | | 428 |
| CALLER CONTINUES TO HEAR AUDIBLE FEEDBACK PROVIDED BY SENDING SWITCH 448 | AUDIBLE FEEDBACK CONTINUES UNINTERRUPTED | 444 | |
| | | 452 | AGENT ASSIGNED CALL FROM QUEUE |
| | | <- ALERTing | 456 |
| | TERMINATE VECTOR PROCESSING AND AUDIBLE FEEDBACK 460 | | |
| CALLER HEARS RINGBACK FROM RECEIVING SWITCH | 464 | | |
| | | 468 | AGENT ANSWERS CALL |
| | | <- CONNect | 472 |
| CALLER SPEAKS TO AGENT | 476 | | |

METHOD AND APPARATUS FOR THE EFFICIENT UTILIZATION OF TRUNK BANDWIDTH IN A GLOBAL ENTERPRISE

FIELD OF THE INVENTION

The present invention relates to the efficient use of communication trunk bandwidth in a geographically dispersed enterprise. In particular, the present invention relates to the routing of requests for information made in connection with a geographically dispersed enterprise.

BACKGROUND OF THE INVENTION

Large enterprises may have a geographically dispersed network of agents to service client requests for information and services. At times, the number of requests for information or service received at a service center exceeds the number of agents available to respond to such requests. Accordingly, callers initiating requests for service often must be placed on hold. While on hold, callers are often provided with a continuous stream of general information, which may include music and announcements. The provision of music is intended to make the wait for an available agent more palatable. Announcements may include information of a general nature that is provided as a service to the caller or they may include advertisements regarding products and services available from the enterprise or affiliated companies. The stream of general information is typically interrupted when a call is routed to an available agent for servicing.

The designers of communication networks for an enterprise typically have data available to them concerning the number of agents that will be associated with a call center, and the typical duration of such calls. However, the number of callers that may be on hold, awaiting service at any one time, is difficult to predict. Furthermore, the continuous nature of the general information that is provided to callers while they are waiting for an available agent makes the sizing of communications channels difficult.

In many enterprises, the bulk of incoming requests for information originate within the United States or the European Union. However, because of high labor costs in the United States and the countries of the European Union, staffing call centers to respond to requests for service generated within those regions can be prohibitively expensive. Accordingly, there is a trend towards locating call centers in low labor cost nations, such as India and the Philippines. In connection with such arrangements, requests for information are typically received at a call center located in the region in which the request for information originated. If no agents are available at that call center, the request for information is forwarded to a remote call center and is placed in a queue maintained by the remote call center. In a typical implementation, music and announcements are provided by the remote call center to the caller while the caller is awaiting service. This situation requires the transmission of a continuous stream of data over long distances, and can result in the consumption of significant amounts of communication channel bandwidth. In addition, it is typically desirable to synchronize the music and announcements provided by the various call centers associated with an enterprise. However, the synchronization of such general information among a number of distantly located call centers can pose a significant administrative burden.

Still other systems delay the routing of a call to remote call centers. Such systems instead create tokens that are distributed to each remote call center. In such systems, a call is not routed to a remote system until notification is received from a remote system indicating that the remote call center is able to service the call. However, such systems are disadvantageous because they do not allow for the use of sophisticated features for handling calls and for routing calls to particular agents that might otherwise be available after responsibility for a call has been assigned to a particular call center.

For the reasons set forth above, there is a need for a method and apparatus that efficiently utilizes communication channel bandwidth in connection with geographically dispersed enterprises. In addition, there is a need for a method and an apparatus for providing general information after a call has been assigned to a particular service center for routing to an agent that is easily administered.

SUMMARY OF THE INVENTION

The present invention is directed to solving these and other problems and disadvantages of the prior art. According to the present invention, requests for information (or calls) are received at a first call center (also referred to herein as a first service center or switch). The request for information may then be assigned to a second call center that is responsible for routing the request for information to an associated agent, and a communication link (i.e. an operative interconnection over a communication channel) between the first and second call centers is established for the call. While a request for information is waiting to be assigned to an agent or source of information, general information is provided to the requester from the first call center.

In accordance with an embodiment of the present invention, the provision of general information from the first call center reduces the bandwidth requirements for the communication channel between the first and second call centers. In addition, the provision of general information from the first call center removes the need to synchronize such general information between multiple switches.

In accordance with an embodiment of the present invention, the first call center is located in a region or country where the request for information originated, while the second call center is located at a distance from the first call center. For example, the second call center may be located in a different region or country than the first call center.

In accordance with still another embodiment of the present invention, a call assigned to a second call center for routing to an agent may be further assigned to a third call center for routing to an agent, in place of the second call center. General information in connection with a request for information that has been assigned to a third call center for routing to an agent may continue to be provided by the first call center.

In accordance with an embodiment of the present invention, once a call center assigned to route a request for service to an agent has an agent available, a signal is sent to the first call center. Upon receiving the signal indicating that an agent is available, the first call center terminates the provision of general information to the caller, and the caller can communicate with the agent at the second call center. Where a request for information has been routed to a third call center through a second call center, communications between the requester and the agent at the third call center may be made via the first and second call centers.

These and other advantages and features of the invention will become more apparent from the following description

BRIEF DESCRIPTION OF THE DRAWINGS

FIG. 4 is a table depicting the operation of a call center arrangement in accordance with an embodiment of the present invention.

DETAILED DESCRIPTION

Figure 1:
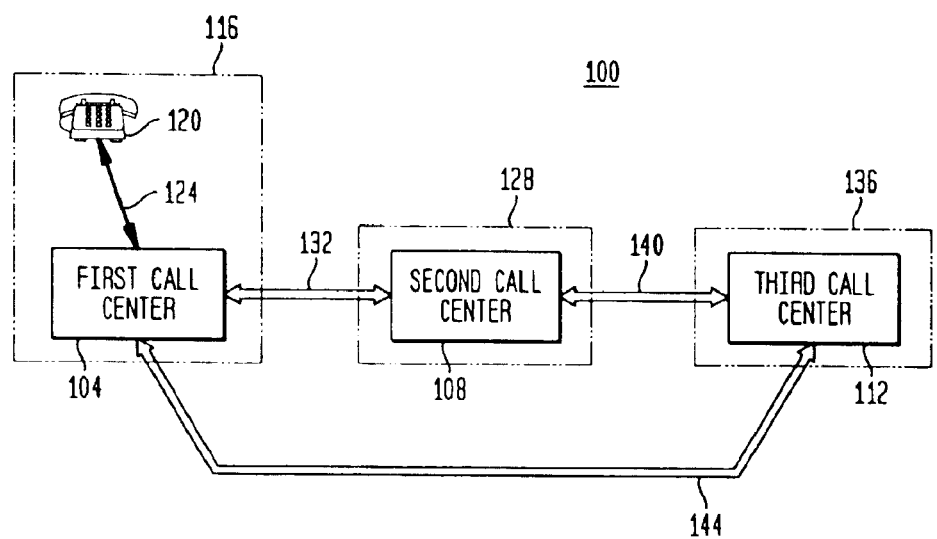
FIG. 1 is block diagram depicting a call center arrangement in accordance with an embodiment of the present invention.

With reference now to FIG. 1, a call center arrangement 100 in accordance with an embodiment of the present invention is illustrated. In general, the call center arrangement 100 includes a first call center 104 (also referred to herein as sending switch 104) and a second call center 108 (also referred to herein as a receiving switch 108). As used herein, a call center may refer to a system comprising a switch. Furthermore, switch is hereby defined to include a server, such as a web server or communications server, or other suitable architecture capable of maintaining incoming calls in queues and/or of routing or forwarding calls to associated agents (or sources of information) or to other call centers for servicing. It should also be appreciated that, as used herein, call may refer to any request for information. As such, "call" may refer to a request for information delivered in a form other than an audible communication. For example, the request may comprise a request for a web page. In accordance with a further embodiment of the present invention, additional call centers may be included. For example, as illustrated in FIG. 1, a third call center 112 may be included in the call center arrangement 100.

The first call center 104 is typically located in a first region or country 116. In general, the first call center 104 is located in a region or country 116 in which a request for information or a telephone call from a first communication device or telephone 120 is located. As used herein, in addition to a telephone, the communication device 120 may comprise any device for enabling or facilitating communications, such as a computer terminal, a television, a video telephone, or a personal digital assistant or other handheld communication device. However, the first call center 104 and the first communication device 120 are not required to both be in the same region or country. The first communication device 120 and the first call center 104 may be interconnected by a communication channel 124 that comprises the public switched telephony network. Alternatively or in addition, the communication channel 124 may comprise a computer network, such as the Internet, and may utilize voice over Internet protocols (VoIP) for transferring information between the first call center 104 and the communication device 120.

The second call center 108 may be located in a region or country 128 that is different than the region or country 116 in which the first call center 104 and the first communication device 120 are located. Furthermore, it should be appreciated that the first region or country 116 may be separated from the second region or country 128 by a great distance. As an example, the first region 116 may comprise the nations of the European Union, while the second region or country 128 may be India. As a further example, the first region or country 116 may be the United States, and the second region or country 128 may be the Philippines. It should also be appreciated that the present invention may be used to interconnect call centers (e.g., call centers 104 and 108) without regard to the location of the caller (i.e. of telephone 120). For example, the first region or country 116 may be a city, such as Chicago, at which the first switch or call center 104 is located, and the first communication device 120 may be located in Los Angeles. The second region 128 in this example may be a city remote from the first, such as Denver, at which the second switch or call center 108 is located. Accordingly, the present invention may be applied to call center arrangements in which all calls are initially received at a first call center 104, and in which additional call centers 108 and/or 112 may be utilized to service those calls.

The first call center 104 is interconnected to the second call center 108 by a communication channel 132. The communication channel 132 may comprise a switched circuit or a packet data channel network. In general, the communication channel 132 has a finite bandwidth. Accordingly, controlling or limiting the amount of data passed over the channel 132 by one or more consumers of the channel bandwidth is desirable. Furthermore, where, for example, the communication channel 132 comprises leased lines or lines that result in toll charges being incurred when data is transferred using the channel 132, cost savings can be realized by limiting the amount of data passed over the channel 132 by consumers of the channel bandwidth.

In accordance with a further embodiment of the present invention, a call center arrangement 100 may comprise additional call centers located in the same or additional regions or countries. For example, as illustrated in FIG. 1, a third call center 112 maybe located in a third region or country 136. The third region or country 136 may be located at a distance from either or both of the first 116 or second 128 regions or countries. For example, a call center arrangement 100 may have a first call center 104 located in a first region or country 116 that comprises the United States, a second switch or call center 108 located in a second region or country 128 that comprises India, and a third switch or call center 112 located in a third region or country 136 that comprises the Philippines.

The third call center 112 may be interconnected to the second call center 108 by a communication channel 140. The communication channel 140 may comprise a switched circuit network. Alternatively or in addition, the communication channel 140 may comprise a packet data network. Furthermore, the third call center 112 may be interconnected to the first switch or call center 104 by a communication channel 144 that is not routed through the second switch or call center 108.

Figure 2:
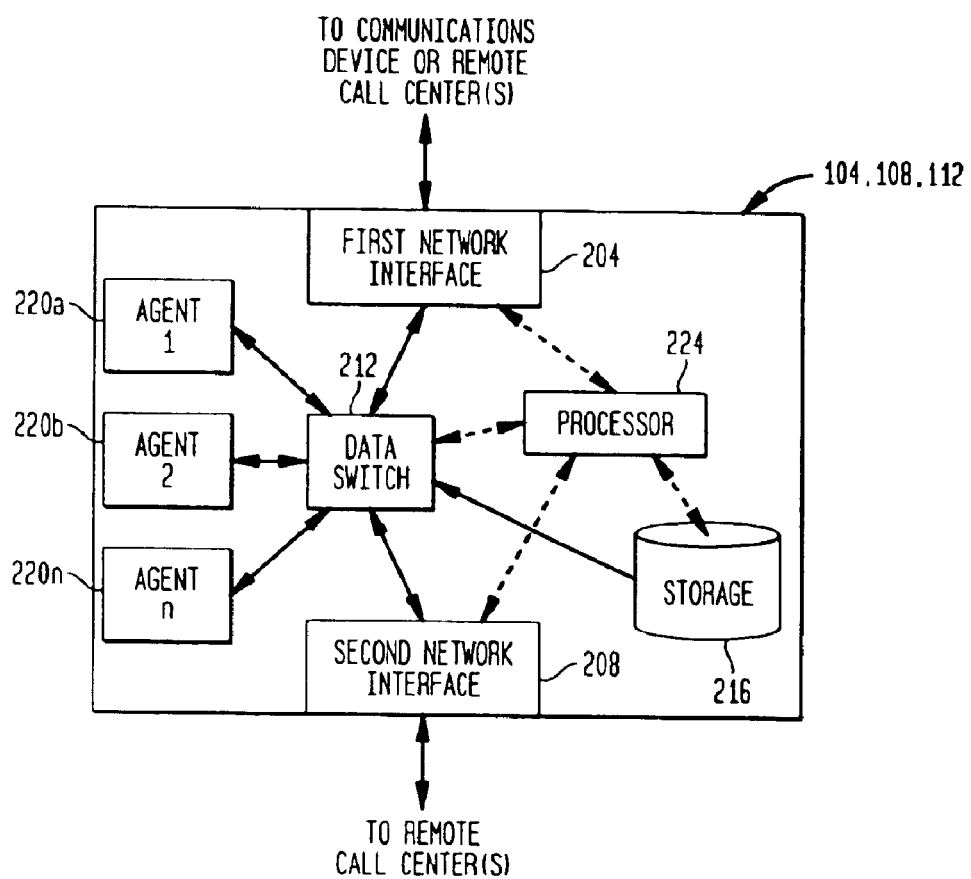
FIG. 2 is a block diagram depicting a call center in accordance with an embodiment of the present invention.

With reference now to FIG. 2, a call center 104, 108, 112 is depicted in block diagram form. In general, the call center 104, 108, 112 comprises a first network interface 204 for interconnecting the call center 104, 108, 112 to a communications device 120 (e.g., in the case of a first switch or call center 104) and/or to a remote call center. In addition, the call center 116, 128, 136 may comprise a second network interface 208 for interconnection to a remote call center or centers.

Data is routed through a data switch 212 included as part of the call center 104, 108, 112. The data switch 212 may be operated to pass information (e.g. voice data) between the first 204 and second 208 network interfaces. Alternatively, the data switch 212 may be operated to pass data between data storage 216 included as part of the switch or call center 104, 108, 112 and either of the first 204 or second 208 network interfaces. As still a further alternative, the data switch 212 may pass data between any one of a plurality of information sources or agents 220 and the first network interface 204, the second network interface 208, and the data storage 216. Furthermore, the data switch 212 can be operated to pass data from a first information source or agent (e.g. agent 1 220a) to a second information source or agent (e.g., agent 2 220b). Accordingly, it can be appreciated that, in general, the data switch 212 can be operated to interconnect a component of the switch or call center 104, 108, 112 that handles data to any other component of the switch or call center 104, 108, 112 that handles data.

The data storage 216 may comprise a device or devices capable of storing programs and data for use in connection with the operation of the associated switch 104, 108, 112 and/or the call center arrangement. In addition, and in particular in connection with a first call center 104, the data storage 216 may store general information that is played back to a caller through a communication device 120. The data storage may comprise magnetic storage devices, optical storage devices, and/or solid state storage devices.

In addition to human agents, it should be appreciated that the information source or sources 220 associated with a call center 104, 108, 112 may comprise any source of information or limited resource. For instance, an information source 220 may comprise a database. In addition, the information source 220 may comprise processor capable of performing operations in response to instructions received from a communication device 120. Other types of information sources 220 may include communication ports, applications, and threads running on a software processor.

In addition, the call center 104, 108, 112 may include intelligence, such as may be associated with a processor 224, for controlling the operation of the call center 104, 108, 112. For example, the processor 224 may comprise a general purpose computer processor running programming code implementing the functions of the call center 104, 108, 112 in accordance with a call center arrangement 100 as described herein. As a further example, the processor 224 may be provided as part of a general purpose or personal computer comprising all or a portion of the call center 104, 108, 112 that is operatively connected to appropriate peripherals (e.g., network interfaces 204, 208, a data switch 212 and input and output devices for use in association with the agents 220). In addition, the switch or call center 104, 108, 112 may comprise a server or other computer implementing the functions described in connection with FIG. 2. As a further example, the switch 104, 108, 112 may comprise an automatic call distribution system (ACD), such as the Definity® private-branch exchange (PBX) based ACD system available from the assignee of the present invention.

Figure 3:
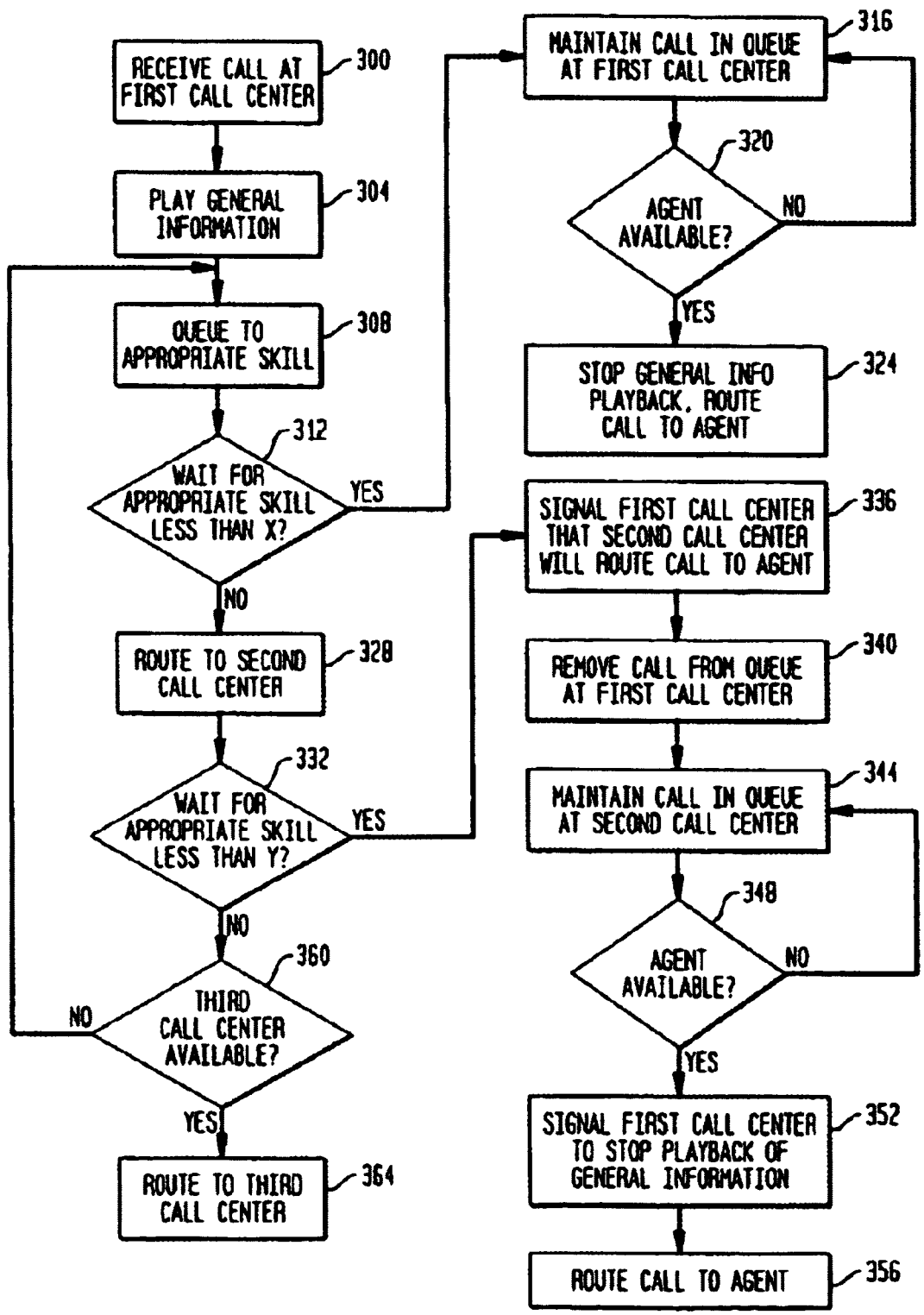
FIG. 3 is a flow chart illustrating the handling of a call in accordance with an embodiment of the present invention.

With reference now to FIG. 3, a flow chart depicting the operation of a call center arrangement 100 in accordance with an embodiment of the present invention is shown. In general, at step 300, a request for information (e.g., a telephone call) is received at the first call center 104. In response to receiving the call, the call center 104 plays back stored data or general information (step 304). The general information may include generic information related to the information or services that may be obtained by the caller. In addition, the general information may comprise music or other entertainment. In accordance with an embodiment of the present invention, the general information comprises a mixture of announcements and entertainment. In accordance with still another embodiment of the present invention, announcements may include information regarding the anticipated time that the caller will be required to wait before an agent 220 is available. The general information may be delivered as audible information, for example, in connection with a request for information initiated using a first communication device 120 comprising a telephone. In accordance with a further embodiment of the present invention, the general information may comprise a slide show, such as a PowerPoint® presentation, or a series of web pages, for example, in connection with a request for information initiated using a first communication device 120 comprising a computer terminal. In accordance with yet another embodiment of the present invention, the general information may be provided as an audio/video presentation, for example in connection with a request for information using a first communication device 120 comprising a video telephone.

The received call is then placed in a queue established at the call center 104 for the appropriate skill (step 308). In accordance with an embodiment of the present invention, a queued call is passed to the next available agent 220 having the skill required to service the call on a first in first out basis. The determination of the appropriate skill to associate with a call may be made in a variety of ways. For example, separate addresses (e.g., telephone numbers) may be assigned for different skills. As a further example, the caller may provide information regarding the nature of the call, and thus the appropriate skill to associate with the call, by entering a touch tone or a voice command in response to a query made by the first call center 104.

Next, a determination is made as to whether the wait for the appropriate skill is less than some predetermined amount of time (time x) (step 312). If the expected wait time is less than the predetermined amount of time, the call may be placed in a queue maintained at the first call center 104 (step 316). When it is determined at step 320 that an agent is available, the playback of general information is stopped, and the call is routed to the available agent 220 (step 324). If it is determined at step 320 that no agent 220 is available, the call is maintained in the queue at the first call center 104 (step 316).

If at step 312 it is determined that the expected wait time for the skill associated with the call is equal to or greater than the predetermined time x, the call is routed to the second call center 108, at which time a communication link for the call is established between the first call center 104 and the second call center 108, for example over the communication channel 132 (step 328). A determination is then made as to whether the expected wait time for the appropriate skill at the second call center 108 is less than a predetermined amount of time y (step 332). If the expected wait time for the appropriate skill is less than the predetermined time y, the second call center 108 signals the first call center 104 that the second call center 108 will accept responsibility for routing the call to an agent 220 (step 336). Upon receiving the signal that the second call center 108 will accept responsibility for routing the call, the first call center 104 removes the call from the queue maintained at the first call center 104 (step 340). The call is then placed in a queue for the appropriate skill maintained at the second call center 108 (step 344).

At step 348, a determination is made as to whether an agent 220 is available to handle the call. If an agent 220 is not available, the call continues to be held in the queue maintained on the second call center 108.

If at step 348 it is determined that an agent 220 is available to handle the call, the second call center 108 signals the first call center 104 to stop playback of the general information (step 352). The second call center 108 then routes the call to an agent 220 for handling, and the communication link for the call is terminated to the agent 220 (step 356). In particular, the second call center 108 may operate the data switch 212 to establish a communication channel between an agent (e.g. agent 1 220a) and the first communication device 120 via the first network interface 204 of the second call center 108, the communication channel 132, and the first call center 104.

If the expected wait time is not less than the predetermined time (time y), a determination may be made as whether a third call center 112 is available (step 360). If a third call center is available, the call may be routed to the third call center 112 (step 364). Alternatively, if a third call center is not available, the call may be returned to step 308, or the call may be maintained in a queue at the second call center 108 regardless of the wait time for an agent 220 associated with the second call center 108. As can be appreciated by one of skill in the art, if the call is routed to a third call center 112, steps similar to steps 336 to 356 may be performed in routing the call to an agent 220 associated with the third call center 112.

With reference now to FIG. 4, a sequence of events that may be followed in connection with the operation of a call center arrangement 100 in accordance with an embodiment of the present invention is illustrated. As shown in FIG. 4, a caller may originate a call 404 using a first communication device 120 that is received by a first call center or sending switch 104, for example over a communication channel 124 comprising the public switched telephony network. According to the present example, both the caller utilizing the first communication device 120 and the first switch 104 may be considered to be in a first region or country 116 comprising the United States. In response to receiving the call, a vector, or small program running on the processor 224 of the first call center 104, operates to queue the call at the sending switch 408 (i.e. the first call center 104). Next, the first call center 104 operates to provide audible feedback (i.e. general information) to the caller. Accordingly, the caller hears audible feedback 412 provided by the sending switch 104.

Next, the first call center 104 places a lookahead interflow call attempt 416 to the receiving switch (e.g., second call center) 108. In connection with the lookahead interflow call attempt, the first call center 104 sends a setup signal 420 to the second call center 108. As shown in FIG. 4, the setup signal 420 may comprise an integrated services digital network (ISDN) signal. The use of ISDN type signaling is particularly convenient where the communication channel 132 between the first call center 104 and the second call center 108 is a packet data communication channel. In response to the setup signal 420, vector processing running in connection with the second call center 108 operates to check the acceptance conditions 424. For example, the second call center 108 determines whether expected wait times and/or other criteria are such that the second call center 108 can accept responsibility for routing the call to an agent 220. According to the present example, the call is accepted by the second call center 108 and placed in an appropriate queue 428. As shown in the ISDN messaging column of FIG. 4, the second call center 108 sends a progress signal 432 to the first call center 104 to inform the first call center 104 that responsibility for routing the call to an agent 220 has been accepted by the second call center 108.

In response to receiving the progress signal 432, the first call center 104 dequeues the call 436 in the queue maintained on the first call center 104 for that call type or skill. Although the first call center 104 no longer maintains the call in a queue of calls awaiting service by an agent 220 associated with the first call center 104, vector processing is not terminated 440. In particular, general information, such as audible feedback 448, continues to be provided to the first caller by the first call center 104 uninterrupted 444. Accordingly, the caller continues to hear audible feedback 448 provided by the first call center 104.

Next in the example illustrated in FIG. 4, an agent 220 associated with the second call center 108 is assigned to handle the call that has been waiting in the queue 452 maintained on the second call center 108. In conjunction with the assignment of an agent 220 to the call by the second call center 108, an alerting signal 456 is passed to the first call center 104. In response to receiving the alerting signal 456, vector processing in connection with the call is terminated 460 on the first call center 104. In addition, the provision of audible feedback is terminated 460. The caller hears ringback from the receiving switch 464 in conjunction with the assignment of the agent 220 to the call. The agent 220 then answers the call 468 at which time a connect signal 472 is passed from the second call center 108 to the first call center 104. The caller may then speak to the agent 476.

From the examples of the operation of call center arrangements 100 in accordance with the present invention provided in FIGS. 3 and 4, it can be appreciated that general information is provided to the caller by the sending switch or first call center 104, even though the receiving switch or second call center 108 has accepted responsibility for routing the call to an agent 220. This allows the relatively heavy communication channel bandwidth requirements associated with audible feedback to be supplied by the call center 104 that is relatively local with respect to the first communication device 120. Accordingly, the bandwidth of the communication channel 132 interconnecting the sending 104 and receiving 108 call centers can be sized in accordance with the number of agents or information sources 220 associated with the receiving switch 108. In addition, the present invention allows general information to be stored and played back in connection with the sending switch 104. This arrangement simplifies administration of the general information provided to callers, by allowing announcements and music or other general information to be stored on a storage device 216 associated with the sending switch 104. Accordingly, coordination of general information among various switches or call centers (e.g., first 104, second 108, and third 112 call centers) is not required.

Although the dequeuing of a call from a first call center 104 in response to the acceptance of responsibility for routing the call by a second call center 108 has been described, it should be appreciated that dequeuing is not required. For example, a call may be simultaneously maintained in a number of call center 104, 108, 112 queues, while general information is provided by the first call center 104. The call may be removed from the various queues, and the provision of general information from the first call center 104 terminated, upon assignment of the call to an agent 220 associated with one of the call centers 104, 108, 112.

Although the decision to route a call to a second 108 or third 112 call center has been described in examples given above in response to excessive wait times on a first 104 or second 108 call center, it should be appreciated that the present invention is not so limited. For example, various other reasons may result in the passing of a call from the first call center 104 to another call center (e.g., call center 108 or 112). Examples of such other reasons include the cost associated with the use of an information source 220 associated with a particular call center 104, 108 or 112, the quality of an information source 220 associated with a particular call center 104, 108 or 112, and load balancing considerations. As a further example, various reasons may be considered simultaneously using intelligent systems, such as are described in U.S. Pat. Nos. 5,740,238, 5,754,639, and 6,049,547, the disclosures of which are hereby incorporated by reference in their entirety.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for servicing calls to call centers, comprising:
   establishing a communication link between a caller and a first call center;
   transferring responsibility for establishing a communication link between said caller and an agent to a second call center, wherein said step of transferring responsibility for establishing a communication link between said caller and an agent to a second call center comprises placing call comprising said communication link between said caller and said agent in an agent queue in said second call center;
   establishing a communication link between said caller and said second call center; and
   after said step of transferring responsibility, providing data to said caller from said first call center.

2. The method of claim 1, further comprising:
   placing said caller on hold, wherein said step of providing data to said caller from said first call center occurs at least in part while said caller is on hold.

3. The method of claim 1, wherein said communication link established between said caller and said second call center is made through said first call center.

4. The method of claim 1, wherein said caller and said first call center are located in at least one of a like geographical region and country, and wherein said caller and said second call center are located in at least one of different geographical regions and countries.

5. The method of claim 1, further comprising:
   transferring responsibility for establishing a communication link between said caller and an agent to a third call center;
   continuing to provide data to said caller from said first call center;
   establishing a communication link between said caller and said third call center.

6. The method of claim 5, wherein said communication link between said caller and said third call center is made through said first call center.

7. The method of claim 5, wherein said communication link between said caller and said third call center is made through said first and second call centers.

8. The method of claim 1, wherein said communication link between said caller and said second call center comprises a connection utilizing a packet data protocol.

9. The method of claim 1, wherein data corresponding to said data provided to said caller from said first call center is not stored in a said second call center.

10. A system for routing requests for information, comprising:
    a first switch, comprising;
       a processor;
       at least a first network connection, capable of interconnecting said first switch to a first communication device;
       information storage, wherein stored general information is provided to said first communication device;
    a second switch, comprising;
       a processor;
       a second network connection;
       at least a first information source;
    a first network interconnecting said first and second switches, wherein stored general information is provided to said first communication device by said first switch until said at least a first information source is available to provide information to said first communication device, and wherein said stored general information continues to be provided to said first communication device by said first switch after a call associated with said first communication device has been placed in a queue on said second switch but before said first information source is available.

11. The system of claim 10, wherein said second switch comprises a plurality of information sources, and wherein stored general information is provided to said first communication device until a one of said plurality of information sources is interconnected to said first communication device.

12. The system of claim 11, wherein said first communication device is interconnected to a first available one of said plurality of information sources.

13. The system of claim 10, wherein said first switch is interconnected to a public switched telephony network.

14. The system of claim 10, wherein said first network comprises a packet data network.

15. The system of claim 10, wherein said first switch is geographically distant from said second switch.

16. The system of claim 11, wherein said plurality of information sources comprises a plurality of call center agents.

17. The system of claim 10, wherein said stored general information is provided to said first communication device even in the absence of a request for said stored information.

18. The system of claim 17, wherein said stored general information comprises music.

19. The system of claim 11, wherein said plurality of information sources are capable of responding to enquiries from said first communication device.

20. The system of claim 10, wherein said first communication device comprises at least one of a telephone, a computer terminal, a television, a video telephone, and a handheld communication device.

21. A method for routing requests for information, comprising:
    receiving at a first switch a request for information from a communication device;
    passing said request for information to a second switch;
    placing said request for information in a service queue on said second switch;
    after said placing said request for information in a service queue on said second switch, providing stored general information to said communication device from said first switch;
    removing said request for information from said service queue; and interconnecting said communication device to an information source.

22. The method of claim 21, wherein said information source is associated with said second switch.

23. The method of claim 21, further comprising:
    determining a service queue wait time on said second switch;
    in response to a service queue wait time on said second switch that exceeds a predetermined amount, passing said request for information to a third switch; and
    placing said request for information in a service queue on said third switch.

24. The method of claim 23, wherein said information source is associated with said third switch.

25. The method of claim 21, wherein said information source provides information to said communication device in response to a request for said information.

26. The method of claim 21, wherein said first and second switches comprise at least one of switches and servers.

27. The method of claim 21, wherein said general information comprises at least one of music and announcements.

* * * * *